United States Patent [19]
Beals et al.

[11] 3,737,003
[45] June 5, 1973

[54] ADJUSTABLE CONTROL CONSOLE FOR VEHICLES

[75] Inventors: Duane E. Beals; Russell D. Page, both of Decatur, Ill.

[73] Assignee: Caterpillar Tractor Co., Peoria, Ill.

[22] Filed: May 3, 1971

[21] Appl. No.: 139,362

[52] U.S. Cl. ..................180/78, 74/493, 280/87 A
[51] Int. Cl. ..................................................B60k 29/00
[58] Field of Search ..................74/493, 492; 180/78; 280/87 A

[56] References Cited
UNITED STATES PATENTS

| | | | |
|---|---|---|---|
| 3,032,134 | 4/1962 | Banker | 74/493 |
| 3,520,209 | 7/1970 | Cescone | 74/493 |

*Primary Examiner*—Milton Kaufman
*Attorney*—Fryer, Tjensvold, Feix, Phillips & Lempio

[57] ABSTRACT

The steering wheel together with other controls of an earth moving vehicle such as a motor grader are mounted on a pedestal which may be selectively tilted for optimum positioning for different operators and to enable a particular operator to sit or stand at his convenience. The pedestal is defined by links pivoted together in a configuration which maintains the steering wheel at a substantially constant inclination and which maintains the other controls at preferred positions relative to the steering wheel and is provided with latch means for locking and releasing the pedestal at a selected inclination with a minimum of effort and diversion of attention. The pedestal and controls are arranged to increase safety by obstructing forward pitching of the operator in the event of abrupt vehicle stoppage while providing for rapid escape from the operator's station at either side of the vehicle.

11 Claims, 6 Drawing Figures

INVENTORS
DUANE E. BEALS
RUSSELL D. PAGE

Patented June 5, 1973

INVENTORS
DUANE E. BEALS
RUSSELL D. PAGE

BY
Fryer, Tjensvold, Feix, Phillips & Lempio
ATTORNEYS

Patented June 5, 1973

INVENTORS
DUANE E. BEALS
RUSSELL D. PAGE

BY
Fryer, Tjensvold, Feix, Phillips & Lempio
ATTORNEYS

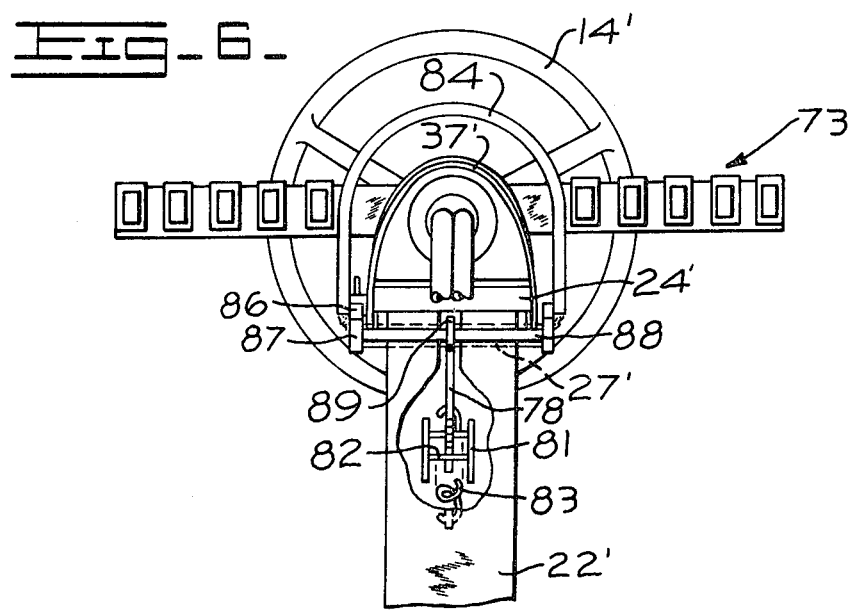

ADJUSTABLE CONTROL CONSOLE FOR VEHICLES

BACKGROUND OF THE INVENTION

This invention relates to vehicle controls and more particularly to control supporting structure which is adjustable relative to the operator's position on the vehicle.

The advantages of providing for adjustable positioning of the steering wheel of a vehicle have been widely recognized and a variety of mechanisms have been designed for this purpose. Most commonly, the steering column on which the wheel is mounted has been articulated so that the operator may tilt the wheel upwardly or downwardly. This enables the steering wheel to be moved upward and forward or downward and backward to adjust to different sized operators and, in the case of certain types of vehicle such as motor graders, to enable an operator to optionally stand or sit while controlling the vehicle.

An articulated steering column of this kind does not provide for maximum operator convenience and comfort and in fact gives rise to an operational difficulty which is not encountered where the steering wheel is fixed in position. In particular, the pivoting of the steering column changes the inclination of the wheel. Most operators prefer that the orientation of the steering wheel remain substantially constant regardless of the height or distance of the wheel from the operator's seat.

Further, any such adjustment of the position of the steering wheel on an articulated column may result in an undesirable change in the location of the other controls relative to the wheel. This has been found to complicate the operator's task, to contribute to operator fatigue and can be an adverse safety factor. An experienced operator tends to acquire kinesthetic feel for the location of the various control elements relative to each other so that a minimum diversion of concentration and effort is required for manipulating various controls. These learned patterns of movement are disrupted when the position of the steering wheel relative to the other controls is changed in an arbitrary manner.

The structure of the control supporting mechanism has still other important effects. Controls are normally situated forwardly from the operator's position and in certain circumstances an abrupt stopping of the vehicle may cause the operator to be pitched forward against such mechanisms. Many prior arrangements of control elements aggravate the possibility of injury in such an event. Prior control element arrangements used on certain vehicles, such as motor graders, have tended to obstruct visibility of areas which the operators desire to see clearly and in many instances have been positioned in a way which may interfere with an operator's rapid escape from the vehicle in the event of an imminent roll-over. Experienced motor grader operators feel much more secure if the option of bailing out of the machine, preferably from either side, is readily available to them.

SUMMARY OF THE INVENTION

The present invention is an adjustable support mechanism for operator's control of a vehicle wherein the steering wheel may be raised and advanced or lowered and retracted relative to the operator's position without substantially changing the inclination of the steering wheel. In a preferred form, other controls are carried upon the support mechanism and are maintained in preferred relationships to the steering wheel regardless of the positioning thereof. These other controls may include control levers and associated linkages in an arrangement wherein the setting of any given lever and linkage is not affected by adjustment of the mechanism. Moreover, in a preferred form, the other controls are so arranged as to provide a positive safety measure, rather than a hazard, by blocking forward motion of the operator while minimizing obstruction of the space to both sides of his seat so that there is no significant interference with entrance and exit from the operator's station. Also in a preferred form, latch means for releasing and locking the support mechanism at a selected position is operable with a simple motion so that a minimum of complication and diversion of attention is required for this purpose.

Accordingly it is an object of this invention to provide for selectively adjustable positioning of the operator's controls on a vehicle in an arrangement which enhances operator convenience, comfort and ease of control and which enhances operator's safety.

The invention together with further objects and advantages thereof will best be understood by reference to the following description of preferred embodiments in conjunction with the accompanying drawings.

BRIEF DESCRIPTION OF THE DRAWINGS

In the accompanying drawings:

FIG. 6 is a front elevation view of the upper portion of the second form of the control console of FIG. 5 with portions of the structure being broken out to illustrate internal latch mechanism.

DESCRIPTION OF PREFERRED EMBODIMENTS

Figure 1:
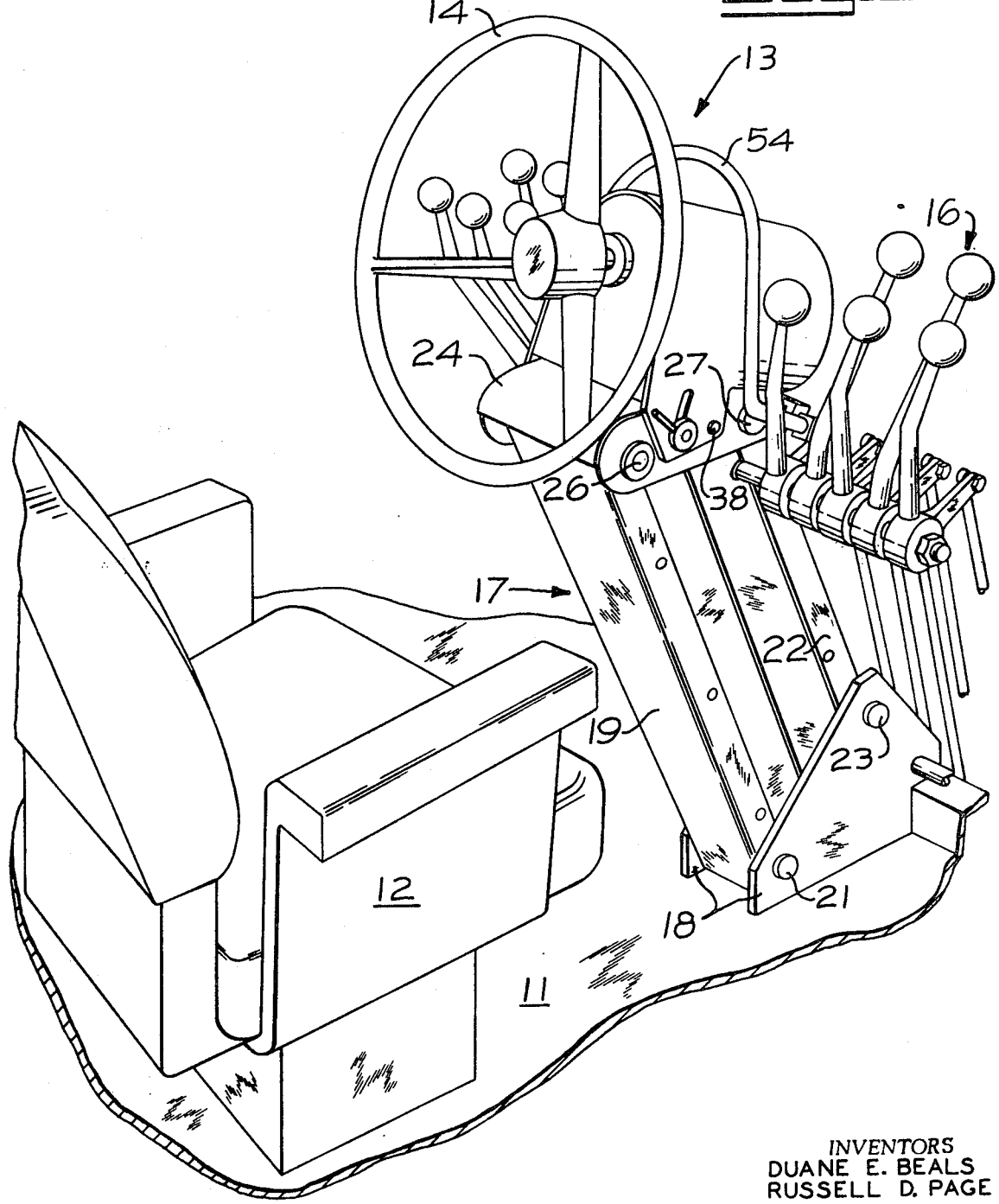
FIG. 1 is a perspective view of an adjustable control console for a motor grader.

Referring initially to FIG. 1 of the drawings, the deck 11 and seat 12 of a motor grader define the operator's station of the vehicle and the adjustable control console 13 in accordance with the present invention is situated immediately forward therefrom. The vehicle itself may be of conventional construction and thus is not described herein, a suitable example of a motor grader vehicle being described in U.S. Pat. No. 3,229,391.

Figure 2:
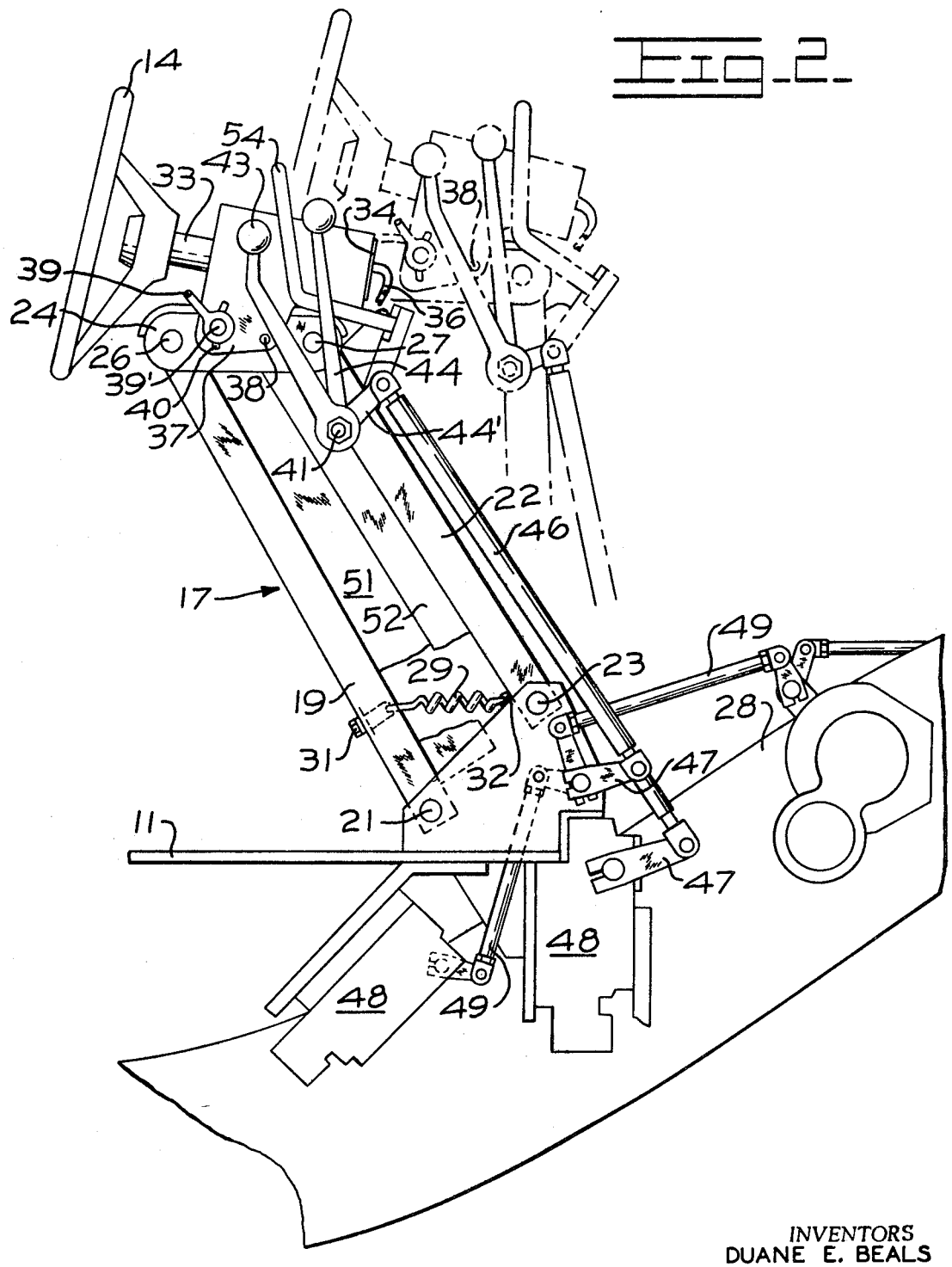
FIG. 2 is a side elevation view of the control console of FIG. 1 with a moved position thereof being shown in dashed lines.
Figure 3:
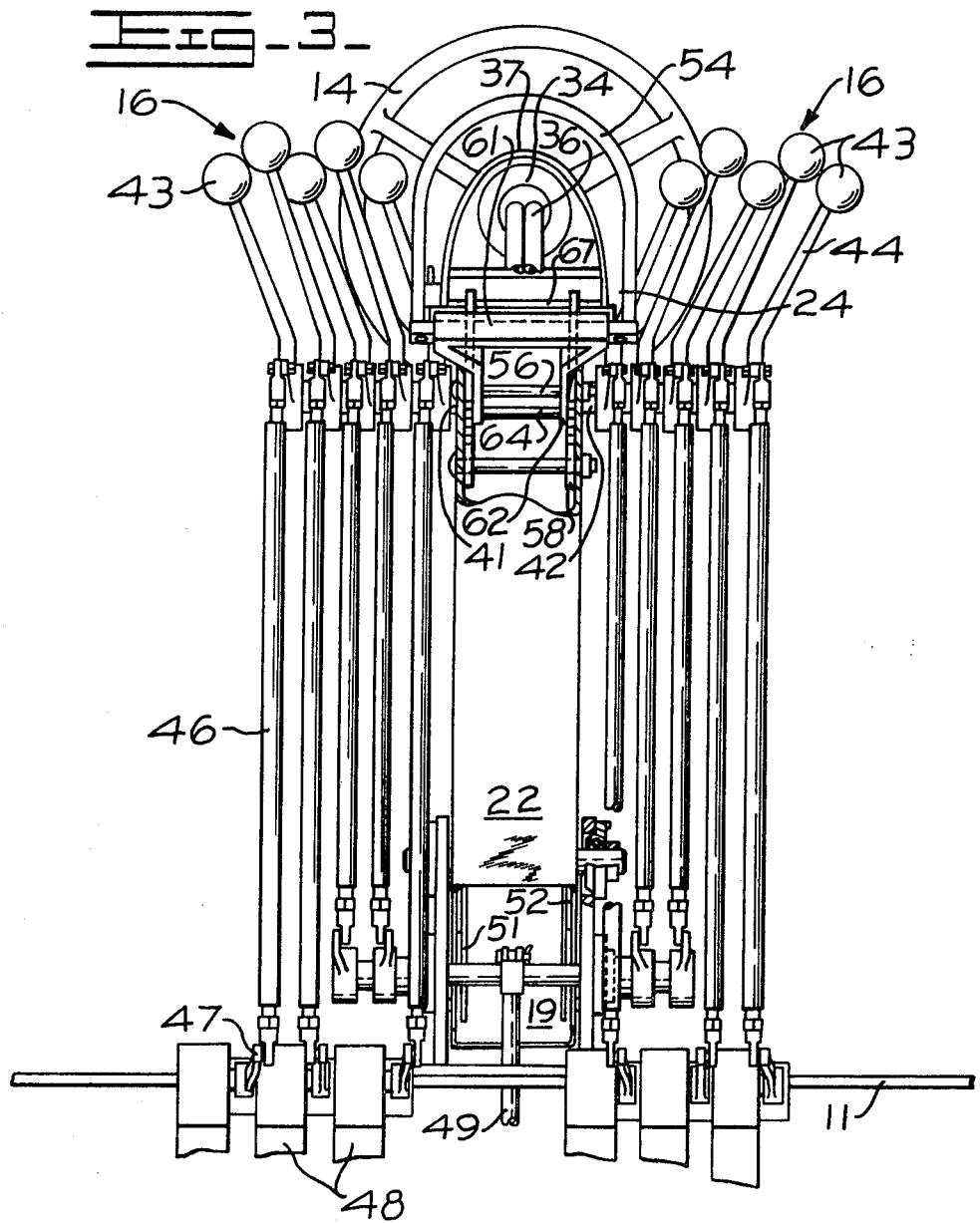
FIG. 3 is a front elevation view of the control console of FIGS. 1 and 2 with portions of the structure being broken out to illustrate latch mechanism.

Any desired number of the vehicle controls, including steering wheel 14 and various other control levers 16 are carried on the upper portion of an adjustable pedestal 17 which attaches to the deck 11 through spaced apart parallel upstanding triangular brackets 18 situated forward from seat 12 and centrally with respect thereto. Referring now to FIGS. 2 and 3 in combination with FIG. 1, pedestal 17 is formed primarily by a rear channel member 19 having a lower end received between the rearward ends of brackets 18 and pivoted thereto by a transverse pin 21, a forward channel member 22 having a lower end received between the uppermost points of brackets 18 and pivoted thereto by another transverse pin 23 and a platform member 24 which spans the upper ends of channel members 19 and 22 and is pivoted to each thereof by additional transverse pins 26 and 27 respectively.

Referring now to FIG. 2 in particular, the above described construction enables the pedestal 17 to be swung from a lowered rearward position illustrated in solid lines while the platform member 24 remains in a substantially constant horizontal orientation. This advantageous result may be realized by proportioning the structure to define a true parallelogram, specifically by making the spacing between pivots 21 and 26 identical to the spacing between pivots 23 and 27 and by making the spacing of pivot 23 from pivot 21 similar to the spacing of pivot 27 from pivot 26. In some vehicles this may not be desirable as such a structure may interfere with existing components of the vehicle such as a frame member 28 which extends through the base region of pedestal 17 in this example. However the desired parallelogram action may still be closely approximated over a limited arc, in a trapezium configuration by an appropriate selection of pivot spacings. In this example, where the spacing of pivot pins 23 and 27 is less than that of pivot pins 21 and 26, compensation is provided by making the spacing of pivot pins 26 and 27 slightly less than the spacing of pivot pins 21 and 23. As is evident from FIG. 2, this adjustment in this embodiment requires that the rear channel member 19 be longer than the front channel member 22. The two channel members 19 and 22 are slightly convergent in the upward direction when the pedestal 17 is pivoted to the lower rearward position (the solid line position) and upon being pivoted to the upper forward position (the dashed line position) the front and rear channel members 22 and 19 become convergent in the downward direction. The net effect is to largely counteract the change in the horizontal orientation of platform 24 which would otherwise occur as a result of the departure from a strict parallelogram configuration.

The weight of the above described structure tends to shift the pedestal 17 to the lower rearward position. In the absence of corrective measures an undesirable amount of operator effort would be required to lift the pedestal to the upper forward position. To counteract the gravity effect, a suitable spring 29 is arranged to exert a counteracting force. In this example of the invention, a tension spring 29 has one end attached to the rear channel member 19 by a suitable retainer 31 and has the opposite end secured to pin 23 by a bracket 32, the spring being situated between the two channel members. SPring 29 thus tends to draw rear channel 19 upwardly against the force of gravity.

Referring now to FIGS. 2 and 3 in conjunction, the steering wheel 14 is disposed coaxially on a short shaft 33 connecting with a cylindrical hydrostatic steering unit 34. Hydrostatic steering units 34 of this kind, which control the direction of travel of the vehicle through fluid pressure signals generated by turning of wheel 14 are known to the art and in the present example the hoses 36 through which the fluid pressure signals are transmitted extend down through pedestal 17 between front and rear channel members 19 and 22. As discussed above, the construction of pedestal 17 maintains the attitude of steering wheel 14 substantially constant as the wheel is raised and lowered, however, different operators may prefer that this substantially fixed inclination be different. Accordingly the hydrostatic unit 34 is attached to the platform 24 through a hood 37 which has side members that extend down at each side of the platform and are pivoted thereto at each side by coaxial pins 38 shown in FIG. 1. Referring again to FIGS. 2 and 3, a manually rotatable clamp 39 is threaded onto a pin 39' which projects from one side of platform 24 through an arcuate slot 40 in one side member of hood 37 to provide for locking the wheel 14 at a desired inclination relative to platform 24.

To support the additional control levers 16 on pedestal 17, coaxial shafts 41 and 42 extend from opposite sides thereof a short distance below platform 24, the shafts being transverse to the vehicle and being parallel to deck 11 and being secured to the forward channel member 22 in this instance. Each control lever 16 includes an arm 44 extending upwardly from shaft 41 or 42 and being pivotably mounted thereon and having a suitable knob 43 at the upper end which may be grasped by the operator. To include a maximum number of control levers 16 in a minimum space with adequate clearance between each knob 43, the levers 16 are arranged in two groups in which one group, consisting of alternate ones of the levers, is angled to situate the knobs thereof forwardly from the knobs 43 of the intervening ones of the levers which constitute the other group. As best seen in FIG. 3, all of the levers 16 of both rows are angled whereby the levers incline away from the hood 37.

Referring again to FIGS. 2 and 3 in conjunction, each lever 16 has a relatively short crank arm 44' extending forwardly from shafts 41 and 42 and connecting with the upper end of an associated one of a series of control links 46. Each such control link 46 extends downwardly to connect with a pivoting actuator arm 47 which controls one of the motor grader function control valves 48 either directly or through interconnecting linkage 49 as determined by the position of the valves 48 relative to the control links 46 which are all coplanar in this example.

As each control lever 16 may pivot relative to the associated support shaft 41 or 42, the settings of the several control valves 48 are not affected by adjustment of the pedestal 17. Moreover, the pivot axis of each lever 16 remains in a substantially fixed position relative to the steering wheel 14 although the levers pivot slightly closer to the wheel 14 as the pedestal 17 is retracted. This maintains the levers 16 at a substantially constant attitude and further facilitates operator convenience in that the operator may be standing when the pedestal 17 is at the upper position and in that position his arms extend downward as well as outward.

In order to close the side regions of pedestal 17 without obstructing the desired movement as described above, overlapping side plates 51 and 52 are disposed at each side of the pedestal, plates 51 being secured to the rear channel member 19 and plates 52 being secured to the front channel member 22.

Figure 4:
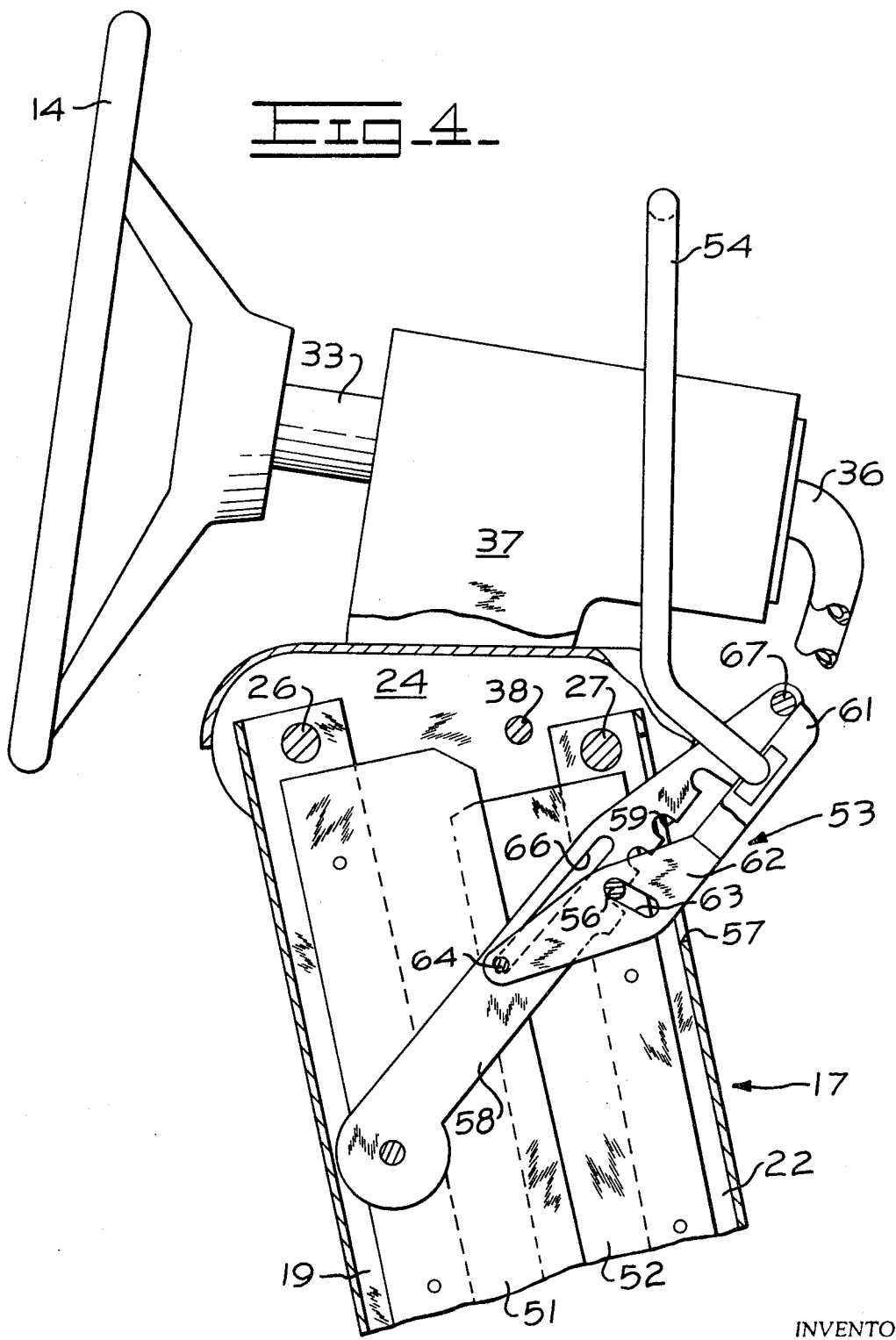
FIG. 4 is a broken out side elevation view of upper portions of the control console of FIGS. 1 to 3 further clarifying the structure of the latch mechanism.

Referring now to FIGS. 3 and 4 in conjunction a latch mechanism 53 is provided which enables the pedestal 17 to be locked at any of a plurality of positions or released for readjustment and which provides for one handed releasing and raising or lowering of the control console by the very simple process of grasping a bail member 54 and pushing or pulling thereon according to whether raising or lowering of the console is desired. Release of the bail 54 relatches the console.

Considering now the detailed structure of the latch mechanism 53, a transverse rod 56 is secured to front channel member 22 immediately to the rear of an opening 57 therein. One of a pair of pivoting arms 58 is attached to each side of rear channel member 19 and each extends forward and upward into the opening 57 of the front channel member 22. Each pivoting arm 58 has a series of notches 59 along the underside thereof which may receive the rod 56 to hold the pedestal 17 at any of a plurality of predetermined inclinations determined by the number and position of the notches along the arms 58. Thus the pedestal may be latched in a selected one of the positions by pivoting the arms 58 to engage rod 56 in a selected notch 59 and the pedestal may be released for adjustment by pivoting the arms 58 a short distance upwardly. For this purpose the bail 54 extends around the top and sides of hood 37 to connect with a latch member 61 having a pair of extensions 62 each of which extends downward and backward into the opening 57 of front channel member 22 adjacent an associated one of the pivoting arms 58. Each such extension 62 has a slot 63 through which rod 56 extends and a transverse rod 64 is carried between the lower extremities of the two extensions 62 and extends through a longitudinal slot 66 in each of the pivoting arms 58.

Accordingly, if the rod 56 is engaged in a particular one of the notches 59 of pivoting arms 58, locking the pedestal 17 in a selected position, then either forward or backward motion of the bail 54 will act to release the rod 56 from the notch to permit pedestal adjustment. If the bail 54 is pushed forward from steering wheel 14 to raise the pedestal 17, extensions 62 are swung downward until rod 56 abuts the upper end of slots 63 at which point the extensions then act as a lever causing rod 64 to pry upward on pivoting arms 58 and release the mechanism. The same forward motion of bail 54 acts to raise the pedestal 17. Conversely, if the rod 56 is again engaged in a selected one of the notches 59 of the two pivoting arms 58, a pulling motion on the bail 54 towards wheel 14 will also act to unlatch the mechanism. In particular, member 61 abuts a rod 67 carried between the upper ends of pivoting arms 58 whereby continued pulling motion prys the pivoting arms 58 upwardly to again disengage notches 59 from rod 56 with the same bail motion subsequently acting to pull the pedestal 17 backward and downward.

Figure 5:
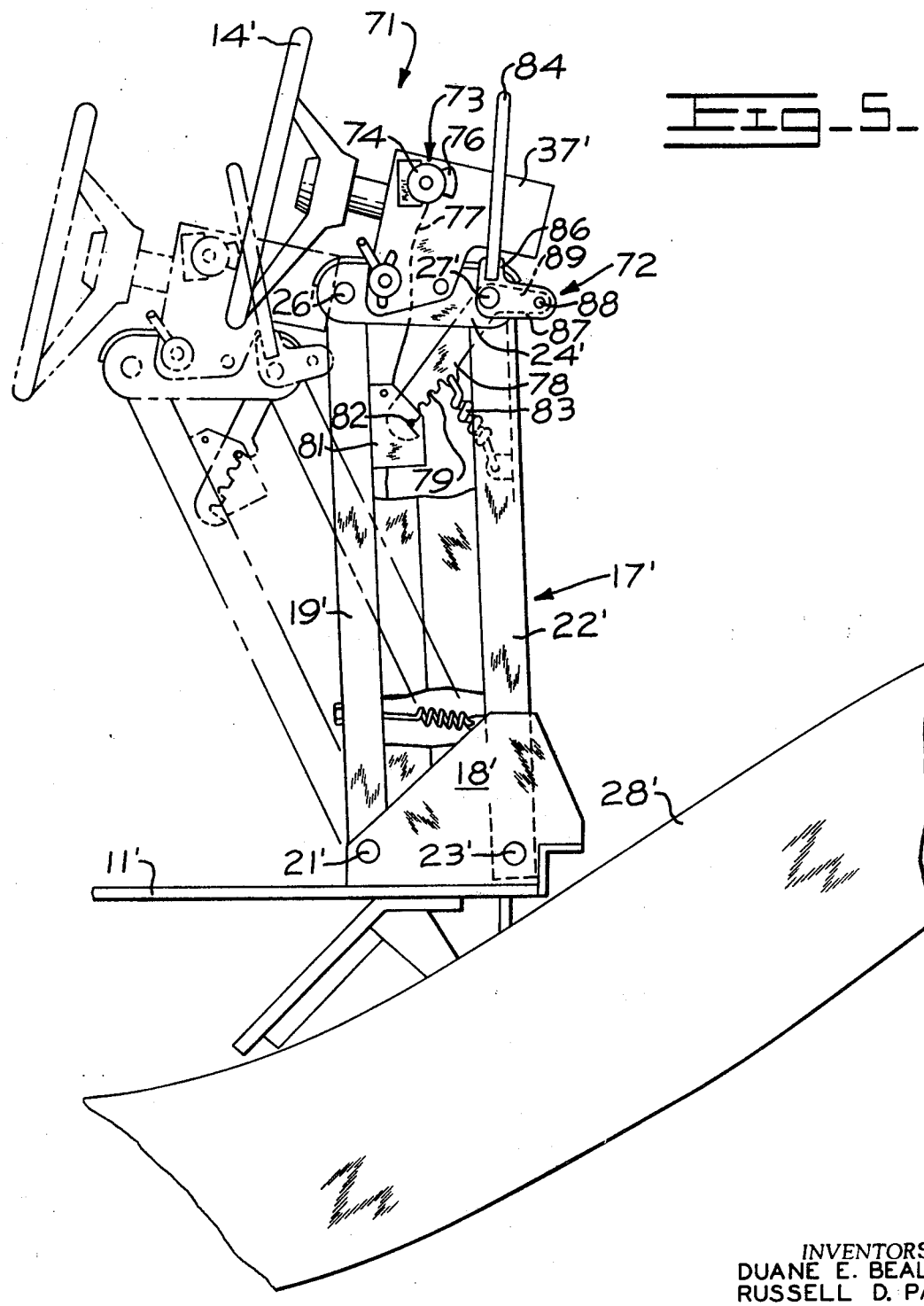
FIG. 5 is a side elevation view of a second form of adjustable control console in accordance with the invention wherein certain elements are controlled by electrical switches and wherein a second form of latch means is employed.

Variations in the structure are possible and the system is adaptable to other forms of control mechanism. FIGS. 5 and 6, for example, illustrate a second embodiment of the adjustable control console 71 having an alternate form of latching mechanism 72 and which carries electrical switch controls 73 rather than the control levers and linkages for fluid valves as in the previously described embodiment.

The adjustable control console 71 may have a pedestal 17' including front and rear channel members 19' and 22' pivoted to brackets 18' at the vehicle deck 11' and carrying a platform 24' at the upper end upon which a steering wheel 14' is adjustably mounted through a hood 37' as in the previously described embodiment of the invention. However the frame member 28' does not extend through the base region of the pedestal in this modified vehicle, the front and rear channel members 19' and 22' may be of equal length, with pivot pins 21' and 23' at the same level, to provide a true parallelogram configuration.

The several electrical switches 74, preferably of a form having finger tip actuator button 76, are mounted in two columns each extending sidewardly from one side of hood 37'. Control wires 77 from the several switches 74 may extend downwardly within the pedestal 17'.

Considering now the modified latch mechanism 72, the pedestal 17' is held at a selected inclination by means of an arm 78 which extends radially from the center of the transverse pin 27' that pivots platform 24' to the forward channel member 22'. Arm 78 has a series of notches 79 along the underside and extends backward and downward from rod 27' between a pair of spaced apart brackets 81 secured to the rear channel member 19' which support a transverse rod 82. Thus engagement of rod 82 into a selected one of the notches 79 of arm 78 acts to hold the pedestal 17' at a selected position. A spring 83 is connected between arm 78 and forward channel member 22' to hold the arm 78 in the locking position.

In order to disengage arm 78 from rod 82 to provide for adjustment of pedestal 17, a bail 84 extends around the side and upper surfaces of hood 37' in spaced relation therefrom. Each end of bail 84 is secured to an individual one of a pair of angle members 86 pivoted to opposite ends of transverse pin 27' whereby forward pivoting of bail 84 turns the angle members 86 about rod 27'. Forwardly directed arms 87 of angle members 86 support a transverse rod 88 which extends through a crank portion 89 of pivoting arm 78.

Pivoting arm 78 may be disengaged from rod 82 by pushing the bail 84 forward relative to steering wheel 14 and the rod 82 may be caused to reengage in one of the notches 79, at a changed position of pedestal 17, by releasing the bail. Thus the latch mechanism 72 differs from that of the previously described embodiment in that the operator must use both hands to lower the pedestal 17 although the pedestal may be raised by simply pushing on bail 84 with one hand as in the previous instance.

While the invention has been described with reference to certain specific examples, it is apparent that numerous modifications are possible and it is not intended to limit the invention except as defined in the following claims.

What is claimed is:

1. An adjustable control console for a vehicle comprising:
   a console support bracket means having means for fixed attachment to said vehicle adjacent the operator's station thereof,
   a pivotable pedestal having a lower end attached to said bracket means and extending substantially upward therefrom, said pedestal having first and second upwardly extending link members each having a lower end pivoted to said bracket means for oscillation about spaced apart parallel axes, said pedestal further having a third platform link extending between the upper ends of said first and second links and being pivoted to each thereof to maintain said third link in a substantially fixed orientation relative to said bracket means as said pedestal is pivoted relative thereto, A first manually manipulatable control element for said vehicle situated adjacent said platform link and supported thereby for movement therewith, and latching means for locking said pedestal against pivoting movement relative to said bracket means at any of a plurality of inclinations relative thereto said latching means having a manually operable element for selectively releasing said latching means to enable pivoting of said pedestal relative to said bracket means.

2. An adjustable control console as defined in claim 1 wherein said first manually manipulatable control element for said vehicle is the steering wheel thereof.

3. An adjustable control console for vehicle as defined in claim 2 further comprising a steering wheel support having said steering wheel rotatably attached thereto, said steering wheel support being pivoted to said platform link whereby the orientation of said steering wheel relative to said platform link may be selectively changed by pivoting of said steering wheel support thereon, and clamp means for locking said steering wheel support at a selected orientation relative to said platform link 4. An adjustable control console for a vehicle as defined in claim 1 further comprising a plurality of additional controls for said vehicle mounted on said pedestal at the upper end thereof, said additional controls including a first series of additional controls situated at a first side of said pedestal in a column extending outward therefrom parallel to the pivot axes of said links and a second series of additional controls disposed at the other side of said pedestal and extending outward therefrom in a column colinear with said first series of controls.

5. An adjustable control console for a vehicle as defined in claim 4 wherein said vehicle has control valves with actuator arms, wherein said additional controls are pivotable angled levers having first arms adapted for manual manipulation by the operator and having second arms extending radially from the axis of said columns of control elements and further comprising a plurality of link means each extending from an individual one of said second arms of said control elements towards said support base for operating said actuator arms of said control valves.

6. An adjustable control console for a vehicle as defined in claim 5 wherein said first arms of alternate ones of said additional control levers extend from the axis of the column thereof at a different angular orientation than said first arms of the intervening ones of said additional control levers whereby said first arms of said additional control levers are separated into two distinct spaced apart rows thereof.

7. An adjustable control console for a vehicle as defined in claim 4 wherein said additional controls are electrical switches.

8. An adjustable control console for a vehicle as defined in claim 1 wherein said means for latching said pedestal against pivoting movement relative to said bracket means comprises an arm pivoted to one of said links and having means for engaging another of said links at any of a plurality of relative angular orientations of said links, and wherein said manually operable element extends upward from said arm and is coupled thereto whereby motion of said element away from said operator's station disengages said arm and pivots said pedestal away from said operator's station.

9. An adjustable control console for vehicle as defined in claim 1 wherein said first link is closer to said operator's station than said second link, and wherein said means for latching said pedestal against pivoting movement relative to said bracket means comprises:

a first arm pivoted to said first link and extending towards said second link and having a plurality of spaced apart notches and having a slot extending therealong, a member disposed adjacent said first arm and having a slot oriented substantially at right angles to said slot of said first arm, a first rod extending transversely from said member into said slot of said first arm, a second rod extending transversely from said first arm to overlap said member, a third rod extending from said second link adjacent said notches of said first arm and through said slot of said member and proportioned to be received in a selected one of said notches of said first arm, and said manually operable element being latch operating means extending from said member and positioned to be grasped by the operator of said vehicle, whereby both pulling and pushing motion on said latch operating means by said operator acts to disengage said third rod from a notch of said first arm and said pedestal may be pivoted away from said operator's station or towards said operator's station by the same motion which disengages said third rod from said first arm.

10. An adjustable control console for a vehicle as defined in claim 1 wherein said first and second links are channel members and further comprising a pair of overlapping side plates disposed at each side of said pedestal one of said pair of side plates at each side of said pedestal being secured to said first link and the other being secured to the second link whereby the region between said links is substantially enclosed.

11. An adjustable control console for a vehicle as defined in claim 1 wherein said first link is closest to said operator's station and is of greater length than said second link with the lower end of said first link being pivoted to said bracket means at a level below the pivotable attachment of the lower end of said second link thereto and wherein the pivot attachments of said platform link to the top end of said first and second links are more closely spaced than the pivot attachments of the lower end of said links to said bracket means.

* * * * *